United States Patent
Lindstrom et al.

(10) Patent No.: US 6,787,207 B2
(45) Date of Patent: Sep. 7, 2004

(54) MULTI-LAYER PRESSURE PIPE OF A PLASTIC MATERIAL

(75) Inventors: Helge Lindstrom, Hamari (FI); Anders Nymark, Porvoo (FI); Pekka Heikkila, Wezembeek-Oppem (BE); Carl-Gustaf Ek, Stenungsund (SE)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 09/998,182

(22) Filed: Dec. 3, 2001

(65) Prior Publication Data

US 2002/0094400 A1 Jul. 18, 2002

Related U.S. Application Data

(63) Continuation-in-part of application No. 09/180,020, filed as application No. PCT/FI97/00255 on Apr. 29, 1997, now abandoned.

(30) Foreign Application Priority Data

Apr. 30, 1996 (FI) .................................. 961834

(51) Int. Cl.[7] .................................. F16L 7/14

(52) U.S. Cl. .................. 428/36.91; 428/34.7; 428/36.3; 138/153; 138/174

(58) Field of Search .............................. 428/36.91, 34.5, 428/34.7, 36.3; 138/137, 153, 174; 264/108, 209.1

(56) References Cited

U.S. PATENT DOCUMENTS

| | | | |
|---|---|---|---|
| 3,279,501 A | 10/1966 | Donald | 138/118 |
| 3,651,187 A | 3/1972 | Cessna | 264/108 |
| 3,900,048 A | 8/1975 | Isham et al. | 138/144 |
| 3,933,960 A | 1/1976 | Cameron et al. | 264/108 |
| 4,056,591 A | 11/1977 | Goettler et al. | 264/108 |
| 4,883,622 A | 11/1989 | Dealy et al. | 264/108 |
| 5,236,018 A | 8/1993 | Kobayashi et al. | 138/172 |
| 5,387,386 A | 2/1995 | Kirjavainen | 264/171.29 |
| 5,842,505 A | * 12/1998 | Tokui et al. | 138/140 |
| 6,076,864 A | * 6/2000 | Levivier et al. | 285/405 |

FOREIGN PATENT DOCUMENTS

| | | |
|---|---|---|
| DE | 2 551525 | 5/1976 |
| FI | 83184 | 6/1988 |
| GB | 2 096533 A | 10/1982 |
| JP | 4 201244 A | 6/1992 |
| WO | WO 8911961 | 12/1989 |
| WO | WO 9507428 | 3/1995 |

* cited by examiner

Primary Examiner—Harold Pyon
Assistant Examiner—Alicia Chevalier
(74) Attorney, Agent, or Firm—Birch, Stewart, Kolasch & Birch, LLP

(57) ABSTRACT

The invention relates to a multi-layer pressure pipe (20) of a plastic material. The multi-layer pressure pipe (20) is formed by using as the extruder an extruder (10) which cross-orients the reinforcement fibers in the extruded material in the successive layers (21,22,23,24), and that the material extruded is a polyolefin which contains long-fiber reinforcements.

9 Claims, 2 Drawing Sheets

(c)

(d)

(a)    Tube direction →    (b)

MULTI-LAYER PRESSURE PIPE OF A PLASTIC MATERIAL

This application is a continuation-in-part of application Ser. No. 09/180,020, filed Oct. 30, 1998, which is a U.S. National Phase PCT of International Application No. PCT/FI97/00255, filed Apr. 29, 1997, the entire contents of which are hereby incorporated by reference.

FIELD OF THE INVENTION

The invention relates to a multi-layer pressure pipe of a plastic material.

BACKGROUND OF THE INVENTION

Pipes are used, for example, for the conveying of liquids and gases and as various structural parts in machines and apparatus, in transport vehicles, in the building industry, etc. By the use of plastic pipes, significant advantages over metal pipes can be gained in many applications. Typical advantages of plastic pipes over metal pipes include their light weight, corrosion resistance, moldability in manufacture, and electrical and thermal insulation capacity.

Plastic pipes are manufactured typically by extrusion. Reinforced-plastic pipes are manufactured most commonly by pultrusion, winding, rolling or compression molding.

Non-reinforced plastic pipes are manufactured from, for example, PVC, poly-ethylene, polypropylene, polybutene, and crosslinked polyethylene. Reinforced plastic pipes are commonly manufactured from glassfiber and thermoset plastic, which may be, for example, polyester, vinyl ester or epoxy.

It is known that lightweight and corrosion-resistant structures can be achieved by using thermoplastic pipes. The problems involved with thermoplastic pipes typically include low mechanical strength properties and susceptibility to creep when loaded.

Furthermore, their impact resistance is poor at low temperatures, and for pressure resistance the pipes must be made thick-walled.

On the other hand, it is known that pressure-resistant and rigid structures can be obtained by the use of reinforced-plastic pipes. However, reinforced-plastic pipes are easily damaged by impact, whereupon they lose some of their mechanical strength properties and become susceptible to environmental effects, such as corrosion. Furthermore, the wear resistance of reinforced-plastic pipes is low in some conditions.

Attempts have been made to improve the weak properties mentioned above by manufacturing composite pipes by forming a reinforced thermoset layer around a thermoplast pipe. With pipes thus manufactured, a good inside wear resistance and chemical resistance, as well as a good resistance to pressure and good rigidity, are achieved. However, brittleness typical of thermoset plastics renders the pipe susceptible to impact break. In such a case the thermoset outer pipe may break, whereupon its structure is exposed to corrosion and its mechanical strength is reduced. Furthermore, sufficient adhesion is not achieved on the interface between the thermoset and thermoplastic pipes, and so delamination, i.e. detaching of the layers from each other, will occur on the interface when the pipe is subjected to sufficient stress. This phenomenon will cause the reduction of both mechanical and chemical strength in the pipe.

In addition, attempts have been made to correct the above-mentioned weaknesses of plastic pipes by combining thermoset and thermoplastic pipes with each other in different orders, or thermoplastic pipes have been combined with other thermoplastic or thermoset pipes so that their interfaces are tightly fitted to each other. However, these structures do not eliminate from the pipes the discontinuity points caused by the interfaces, which discontinuity points cause weakening of the structure owing to the above-mentioned impact damage, to material-specific thermal expansion coefficients of the different pipe types, or to elongation.

In order to eliminate the discontinuity points in the joints between the different layers of a pipe, U.S. Pat. No. 3,900,048 discloses a manufacturing method for reinforced plastic pipes wherein a glassfiber-reinforced, thermoplastic, non-crosslinked polymer is attached around a thermoplastic core pipe by means of a solvent. According to the method disclosed in the publication, the clear interface between the layers can be caused to disappear by means of a solvent.

Success according to U.S. Pat. No. 3,900,048 presupposes that the thermoplastic pipe and the polymer matrix of the glassfiber-reinforced polymer layer are soluble. However, materials which are not soluble or which are very difficult to dissolve are commonly also used in pipes. The dissolving of a polymer is in many cases time-consuming, and therefore such a method is often not suitable for practical applications. Furthermore, non-desirable solvent residues of the solvent used may be left in the pipe.

Patent application WO 9507428 discloses a thermoplastic composite pipe which is made up of a thermoplastic core pipe and, surrounding it, a composite material made up of a thermoplastic and continuous reinforcement fibers. The thermoplastic core pipe and the surrounding composite material made up of a thermoplastic and continuous reinforcement fibers are thermally fused to each other seamlessly.

The thermoplastic matrix polymer of the composite material and, when so desired, the thermoplastic core pipe are heated at their joint to the melting or fusion point of the thermoplastic in order to produce a seamless joint.

The thermoplastic composite pipe is manufactured by winding a windable composite material made up of a thermoplastic and continuous reinforcement fibers around a thermoplastic core pipe by using a winding angle of 0–180° or different angles in selected layers, preferably a winding angle by means of which the composite material being wound can be wound into an even layer A thermoplastic composite pipe may be manufactured by a so-called prepreg method described in WO 9507428 by applying onto a selected thermoplastic core pipe a composite material made up of a thermoplastic and a continuous reinforcement phase in such a manner that a tape-form composite material of suitable width, selected according to the core pipe diameter and the selected winding angle, is directed from a reel onto the periphery of the rotating core pipe. The seamless fusion of the composite material tape and the thermoplastic core pipe is achieved by heating the composite material to its softening or melting temperature before it is directed onto the core pipe surface. Furthermore, it is also possible to heat the surface of the core pipe at the fusion point so that the outermost surface of the pipe is at a temperature at which softening and/or melting can occur. The fusion of the thermoplastic phases in molten state to each other is ensured by tension of the composite-material tape being wound around the core pipe, the tension causing a pressure advantageous for the fusion, at the point at which the said melt phases meet. Fusion occurs when the melted meeting point of the composite material and the core pipe cools from the melting temperature while the said composite-material tape is still under tension. The fusing of the composite-material layers subsequent to the first composite-material layer onto the periphery of the strong thermoplastic pipe blank is carried out in a corresponding manner. The fission can also be ensured by compression molding the pipe at the point of fusion, by means of a pressure roll or the like.

It is known that plastic sewer pipes, such as PVC pipes, have been manufactured by using an extruder. The strength of such a sewer pipe is determined by the additives used in the material being extruded and by the amounts of such additives. However, when a conventional axial single-screw extruder is used, for example the reinforcement fibers settle only in the longitudinal orientation of the pipe, for which reason the bending strength of the pipe will remain low.

In the so-called winding technique disclosed in WO 9507428, the reinforcement fibers of, for example, glassfiber are short fibers, usually in the order of magnitude of fractions of a millimeter. Furthermore, such a multiple-step manufacturing method is relatively expensive, for which reason it is not the best possible method for manufacturing pressure pipes.

Publication DE 2551525 discloses fiber reinforced pipes, process and arrangement for their production. It is particularly concerned with fiber reinforced pipes containing one fiber reinforced layer which can be provided on the inside and/or on the outside with a thin layer of different thermoplastic plastic. This publication is concerned with a fiber reinforced pipe with only one layer containing fiber reinforcement. Support for this can also be found on page 5, fourth paragraph, where the process for the manufacture of such pipes is disclosed. Accordingly, in the process a thermoplastic polymer is mixed with fibers and it is fed under pressure to the inlet of a ring-shaped extrusion slit and it is brought into rotation via the inner and outer wall of the extrusion slit which rotate in opposite directions.

Further, it is well known in the art that extrusion equipment containing a ring-shaped extrusion slit with rotating inner and outer walls yield fiber reinforced pipes with orientation only on the surfaces of the oriented layer and the orientation of the fibers below the surfaces remains longitudinal to the axis of the pipe. Such pipes tend to be apt to break in the horizontal direction because the reinforcing fibers are mainly oriented in longitudinal direction to the axis of the pipe resulting in poor reinforcing effect.

Pressure pipes are classified into different pressure categories according to standard SFS 3134 which corresponds to ISO 4065 (1978), and when present-day manufacturing techniques are used, the pressure categories of pressure pipes PN are in general 6, 8 and 10. The melt viscosity $MFR_2$ (Melt Flow Rate) of the plastic raw material of conventional pressure pipes is usually low, usually below 1 g/10 min measured according to ISO 1133, 230° C., 2.16 kg load.

SUMMARY OF THE INVENTION

It is an object of the invention to provide plastic pressure pipes in which the pressure category is considerably higher than that of currently known corresponding pipes.

The objects of the invention are achieved by means of a multi-layer pressure pipe of a plastic material, wherein the multi-layer pressure pipe is formed by using as the extruder a cone extruder which cross-orients the reinforcement fibers in the material in successive layers, and that the extruded material is a polyolefin which contains long-fiber reinforcements.

The idea in the invention is to use as the extruded material a polyolefin, for example polypropylene, which contains a certain amount of long-fiber reinforcements, usually 5–95% by weight preferably 25–75% by weight. In long-fiber reinforcements the fiber length is at least 30 times the fiber diameter. The length of the reinforcements in the pressure pipe is in the order of magnitude of 0.5–50 mm, preferably 1–20 mm, and most preferably 2–15 mm. The reinforcement fibers used may also be continuous fibers which break in the extrusion process. Furthermore, the extruder used is an extruder which in the successive layers will cross-orient the reinforcement fibers in the material being extruded. The number of layers in the tubular product according to the invention is two or more. The melt viscosity, $MFR_2$, of the material used in the manufacture of the tubular product according to the invention is greater than 1, preferably, for example, 10–18 g/10 min. In addition to the reinforced layers the pipes according to the invention may comprise additional plastic layers without any reinforcement fibers, used e.g. as outer shielding layer.

In the invention, by the term "polyolefin" is meant a polymer most of which, at least 50% by weight, is polyolefin. The remainder may thus also be of some other thermoplastic polymer.

In the manufacture of products according to the invention a so-called cone extruder is used which orients, for example, long-fiber glassfiber reinforcements in different directions in successive layers, as a result of which the structure of the product according to the invention will be stronger. Such a product will better withstand pressure inside the pipe, in which case it is possible to achieve, for example, pressure categories of PN 16, 18, 20 and 22, or even higher.

Numerous significant advantages can be gained by the option according to the invention. The strength of a product according to the invention will be substantially better than that of corresponding products manufactured by state-of-the-art methods. The invention enables extruder technology to be used, and the extruded material used can consist of polyolefins instead of PVC materials, whereby detrimental environmental factors are avoided and, furthermore, for example the processibility of the product is considerably better.

The pressure pipe according to the invention comprises two or more layers each containing cross-oriented reinforcement fibers in the extruded material, in the successive layers and the pipe is manufactured using a cone extruder. The whole bulk of the pipe is oriented which means that the complete matrixes of the layers are oriented. Further, the fibers are oriented in each layer in the same manner essentially through the whole layer. This can be achieved using a cone extruder, for example X-cone extruder which provides the desired orientation in two or more layers. The best result can be obtained when the fibers are in 53° axis to the longitudinal direction of the pipe.

Multi-layer pipes according to the invention may be manufactured using a cone extruder in such a way that for example the thick middle layer is completely oriented in horizontal manner. The outer and inner layers may be oriented in longitudinal manner. Thus a strong pressure-resistant pipe can be obtained.

It is surprising that essentially controlled and exact orientation can be achieved in each of the layers, and that polyolefins with low molecular weight, Melt Flow Rate of more than 1 can be used in combination with fiber reinforcement because traditionally polyolefins with higher molecular weight, i.e. having Melt Flow Rate below 1 are considered as suitable for pipe materials. Particularly when a very strong and durable pressure-resistant pipe is desired, it is surprising that low-molecular weight polyolefin can be used.

In accordance with the invention, it is possible to manufacture multi-layer pipes in which the layers are seamlessly attached to each other, so that the layers will not detach from each other. Instead, when, for example, the state-of-the art tape winding technique is used, the different layers may become detached from each other. Furthermore, the invention enables the desired surface properties to be obtained without detracting from the strength. Thus the surface of a product according to the invention may be smooth, rough, resistant to chemicals, etc.

In a pressure pipe according to the invention, the different layers may be of different extrudable materials. It is, however, preferable to use the same type of polyolefin in all layers, whereby the problem of adherence of the layers to each other is best solved. In a multi-layer pressure pipe according to the invention, polypropylene can be used for the inner layer or for all layers, in which case the pipe will have a high resistance to corrosion and a high thermal resistance.

BRIEF DESCRIPTION OF THE DRAWINGS

The invention is described in detail with reference to the principle of the invention depicted in the figures of the accompanying drawing, although the purpose is not to restrict the invention solely thereto.

DETAILED DESCRIPTION OF THE INVENTION

Figure 1:
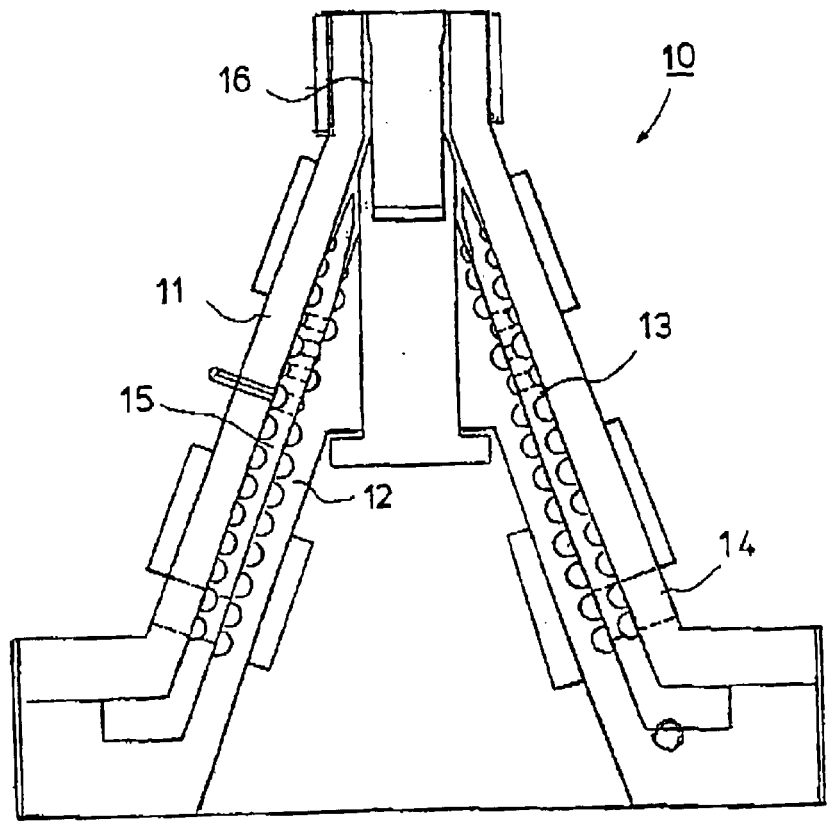
FIG. 1 a schematic cross-sectional representation of one preferred embodiment of the apparatus used in the manufacture of the product according to the invention.

In FIG. 1, the extruder in general is indicated by reference numeral 10. The extruder 10 is a so-called cone extruder, which is described in, for example, U.S. Pat. No. 5,387,386. The extruder 10 has stators 11 and 12, as well as a rotor 13. The inlet for the material to be extruded is indicated by 14. Reference numeral 15 indicates a feeding channel or conduit, in which the material to be extruded is melted after being fed in and is compressed to the final extrusion pressure. The extrusion channel is indicated by reference numeral 16.

When the material flows in the feeding conduit 15, the pressure of the material will change in the following manner. In the feeding-in zone subsequent to the feeding inlet, the pressure is raised to a value of, for example, 3–7 MPa. In the melting zone following the feeding-in zone, the pressure is raised to a value of, for example, 6–14 MPa. Finally, in the compression zone following the melting zone, at a point before the extrusion channel 16, the pressure is raised to a value of, for example, 10–60 MPa.

The extruder according to FIG. 1 can be used for manufacturing double-layer products.

When, for example, the extrusion apparatus described in FI 83184, which has three stators and two rotors, is used it is possible to manufacture four-layer products. By increasing the numbers of stators and rotors it is thus possible to manufacture multi-layer products with the desired number of layers.

Since the so-called cone extruder is known per se and has been described in, for example, U.S. Pat. No. 5,387,386 and FI 83184, the structure of the cone extruder is not described here in greater detail.

Figure 2:
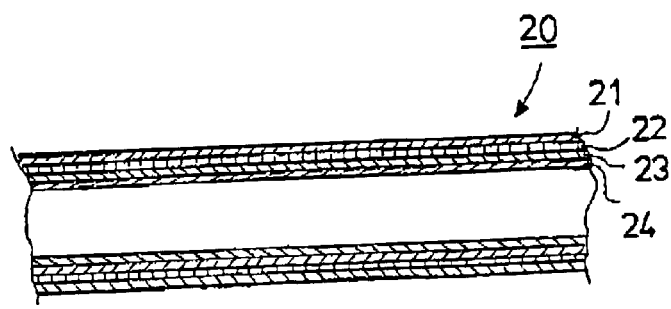
FIG. 2 is a cross-sectional representation of a four-layer product according to the invention.

The pressure pipe depicted in FIG. 2, manufactured according to the invention, is indicated in general by reference numeral 20. In this embodiment the pressure pipe 20 comprises a layer 21 which constitutes the outer surface of the pressure pipe. Layer 22 and, respectively layer 23 constitute the core 1 and, respectively, core 2 of the pressure pipe. Layer 24 constitutes the inner surface of the pressure pipe.

Accompanying Table 1 shows tests results. Samples 1 and 2 are four-layer products according to the invention. Sample 3 is a reference sample. Sample 4 is a double-layer product according to the invention. $MFR_2$ (230° C., 2.16 kg) of the polypropylene used was 15 g/10 min.

Table 1 shows that the best strength is obtained with sample 4, which is a double-layer structure. This is due to the fact that in a double-layer product the long-fiber quality of the reinforcement fibers is maintained in the extrusion process, whereas in a four-layer product the long-fiber reinforcements are broken by the extruder. Furthermore, it is seen in Table 1 that it was not possible even to test sample 3. This reference sample was manufactured from a commercial short-fiber blend, and the sample was so brittle that the devices needed in the testing could not even be attached to it.

Table 2 shows that very good strength properties are achieved with samples 5–10, which are double-layer products according to the invention. Sample 11 is a reference sample, which clearly shows that in the absence of long-fiber reinforcements the strength properties of the product are very low, Sample 12 is also a reference sample, which shows that, when a single-screw extruder is used the strength properties of a double-layer product are relatively low in spite of the fact that the extruded material used contains same amounts of reinforcement fibers as the materials used in the samples according to the invention.

Only the principle of the invention has been described above, and for an expert in the art it is clear that numerous modifications thereof can be lade within the inventive idea stated in the accompanying claims.

TABLE 1

| | Fracturing time (in hours) | | | | |
| --- | --- | --- | --- | --- | --- |
| | +20° C. | | | +80° C. | |
| Material | 18 Mpa | 20 Mpa | 22 Mpa | 8.5 Mpa | 8.75 MPa |
| Sample 1 | | | 667–> | | 430–> |
| Sample 2 | 282+ | 222+ | 69* | 210+ | 13.0* |
| Sample 3 | | | | | |
| Sample 4 | 282+ | 218+ | 786–> | | |

| | | | | | |
| --- | --- | --- | --- | --- | --- |
| Sample 1: | outer surface | polypropylene | 75 wt % | reinforcement fibers | 25 wt % |
| | core 1 | " | 50 wt % | " | 50 wt % |
| | core 2 | " | 50 wt % | " | 50 wt % |
| | inner surface | " | 75 wt % | " | 25 wt % |
| Sample 2: | outer surface | polypropylene | 100 wt % | reinforcement fibers | 0 wt % |
| | core 1 | " | 50 wt % | " | 50 wt % |
| | core 2 | " | 50 wt % | " | 50 wt % |
| | inner surface | " | 100 wt % | " | 0 wt % |

TABLE 1-continued

Fracturing time (in hours)

| | | | | | | |
|---|---|---|---|---|---|---|
| Sample 3: | outer surface | polypropylene | 100 wt % | reinforcement fibers | 0 wt % | |
| | core 1 | " | 100 wt % | " | 0 wt % | |
| | core 2 | " | 100 wt % | " | 0 wt % | |
| | inner surface | " | 100 wt % | " | 0 wt % | |
| Sample 4: | layer 1 | polypropylene | 50 wt % | reinforcement fibers | 50 wt % | |
| | layer 2 | " | 50 wt % | " | 50 wt % | |

+ = stopped
−> = continues
* = brittle fracture
° = tension fracture

TABLE 2

Fracturing time (in hours)

| Cone extruder Double-layer products Polypropylene/ reinforcement fibers | | 20° C. Tension/Mpa | 60° C. Tension/ MPa | 95° C. Tension/ MPa |
|---|---|---|---|---|
| % by weight/% by weight | 13 | 16 | 10 | 5.0 |
| Sample 5 | 50/50 | 1602+ | 6510* | 413* | 224* |
| Sample 6 | 50/50 | | 5717* | 820* | 203.5* |
| Sample 7 | 50/50 | | 10312* | 657* | 366* |
| Sample 8 | 70/30 | | 4624* | 131* | 114.9* |
| Sample 9 | 70/70 | | 6057+ | 205* | 136.9* |
| Sample 10 | 25/75 | | 10717+ | 871.4* | 431* |
| Sample 11 | 100/0 (reference) | | 13.8° | 0.3° | 1.6° |
| Sample 12 | 50/50 (reference) | | 135.6* | 18.7* 20.9* | 18.5 |

+ = stopped
−> = continues
* = brittle fracture
° = tension fracture

Figure 3:
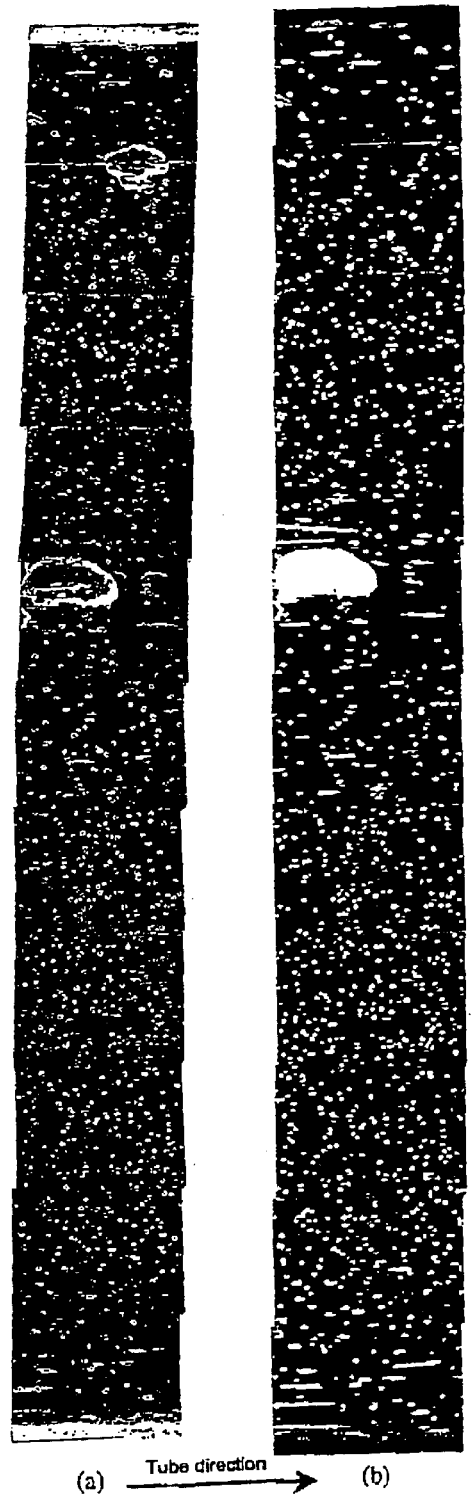
FIG. 3 is a SEM photograph of a four-layer product according to the invention, with fiber orientation and number of fibers.
Figure 3:
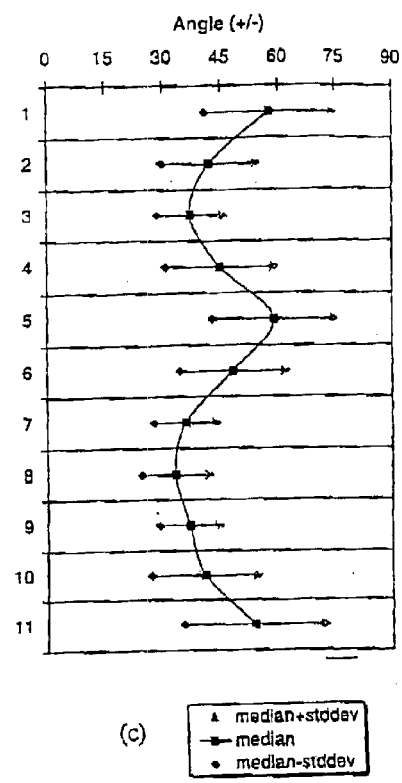
Figure 3:
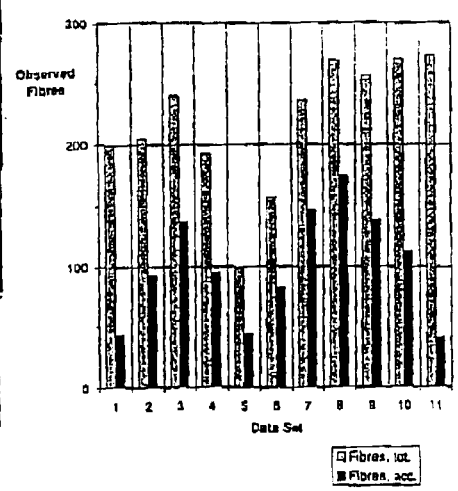

In FIG. 3 the fiber orientation of a 4-layer tube profile made of glassfiber reinforced PP-blends is shown. According to the SEM analysis (scanning electron microscope) the multi-layer tube has actually at least five layers.

A glassfiber reinforced PP-tube made by the 4-layer cone extruder is analyzed, the material of all layers is cutfiber-PP-compound with glass content of 20 wt %. In (a) the cross-section of the wall is shown, (b) the analyzed images, (c) the fiber orientation vs thickens, and (d) the number of analyzed fibers vs thickness.

The extract measurement of the fiber orientation was made by the analysis method based on digital imaging. Tube cross-sections show the direction of reinforcement fibers when SEM photographs of a ground and polished specimen are processed by a digital imaging system. The direction of a single fiber can be determined from the shape of its shear plane, in other words, the direction and length ratios of the principal axes of the fiber's elliptical cross-section. The direction of the long principal axis indicates fiber direction in relation to the tube surface, the ratio of the principal axes indicates the fiber direction in relation to the shear plane, and the length of the short principal axis shows the fiber diameter. For example, a fiber directed along the tube circumference is shown in an axial specimen as a circle, and a fiber oriented at an angle of 30 degrees from the tube axis is shown as a ellipse whose principal axes have a ratio of 1:2. The fiber orientation of different tube layers can be determined by dividing the specimen to sections in the thickness direction. In practice, this means that the layers from the outer surface to the inner are shown in separate pictures.

The results of each layer in one specimen can be combined in a table to determine variation of fiber orientation in the thickness direction. This stage also includes a comparison of axial specimens and specimens cut at an angle of 45 degrees. This comparison reveals the actual direction of fibers in each layer, in other words, if the fibers are oriented clockwise or counterclockwise around the tube or if the orientation is random.

What is claimed is:

1. A multi-layer pressure pipe having a pressure category of PN 16 or greater according to ISO Standard 4065, said pipe comprising seamlessly attached successive layers of an extruded polyolefin matrix having a melt flow rate ($MFR_2$) (230° C., 2.16 kg) of greater than 1 g/10 min. containing about 25 to 75% by weight long-fiber-reinforced layers, wherein the multi-layer pressure pipe is formed by cone extrusion through a cone extruder which cross-orients the reinforcement fibers in the extruded material in the seamlessly attached successive layers.

2. A multi-layer pressure pipe according to claim 1, wherein the melt flow rate ($MFR_2$)(230° C., 2.16 kg) of the polyolefin is from about 10–18 g/10 mm.

3. A multi-layer pressure pipe according to claim 1, wherein the polyolefin is polypropylene and wherein the long-fiber reinforcements are glass fibers.

4. A multi-layer pressure pipe according to claim 1, wherein the length of the long-fiber reinforcements is at least 30 times the diameter of the long-fiber reinforcements.

5. A multi-layer pressure pipe according to claim 1, wherein the length of the long-fiber reinforcements in the pressure pipe is on the order of magnitude of from about 2–15 mm.

6. A multi-layer pressure pipe according to claim 1, wherein the pressure pipe has a double-layer structure.

7. A multi-layer pressure pipe according to claim 1, wherein the pressure pipe has a four-layer structure.

8. The multi-layer pressure pipe of claim 1, wherein the reinforcement fibers are oriented at 53° with respect to the longitudinal direction of the pipe.

9. A multi-layer pressure pipe having a pressure category of PN 16 or greater according to ISO Standard 4065, said pipe having a melt flow rate ($MFR_2$)(230° C., 2.16 kg) of greater than 1 g/10 min. containing about 25 to 75% by weight long-fiber-reinforced layers, wherein the multi-layer pressure pipe is formed by cone extrusion through a cone extruder which cross-orients the reinforcement fibers in the extruded material in the seamlessly attached successive layers, said pipe comprising at least two successive layers of extruded plastic material seamlessly attached to each other, wherein the plastic material is a polyolefin containing long-fiber reinforcement and wherein the reinforcement fibers in each successive layer are oriented in the same direction throughout the layer and are cross-oriented with respect to the adjacent successive layer.

* * * * *